US012769804B2

(12) United States Patent
Chandrashekar et al.

(10) Patent No.: US 12,769,804 B2
(45) Date of Patent: Oct. 20, 2026

(54) SYSTEMS AND METHODS OF ORGANIZING AND PROVIDING BOOKMARKED CONTENT

(71) Applicant: Adeia Guides Inc., San Jose, CA (US)

(72) Inventors: Padmassri Chandrashekar, Bangalore (IN); Daina Emmanuel, Bangalore (IN); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 31 days.

(21) Appl. No.: 18/760,889

(22) Filed: Jul. 1, 2024

(65) Prior Publication Data

US 2025/0005095 A1 Jan. 2, 2025

Related U.S. Application Data

(63) Continuation of application No. 17/363,331, filed on Jun. 30, 2021, now Pat. No. 12,056,200.

(51) Int. Cl.

*G06F 16/955* (2019.01)
*G06F 16/9035* (2019.01)
*G06F 16/904* (2019.01)
*G06F 16/906* (2019.01)
*G06F 16/908* (2019.01)

(52) U.S. Cl.

CPC ...... *G06F 16/9562* (2019.01); *G06F 16/9035* (2019.01); *G06F 16/904* (2019.01); *G06F 16/906* (2019.01); *G06F 16/908* (2019.01); *G06F 16/9558* (2019.01)

(58) Field of Classification Search

CPC ... G06F 16/9562; G06F 16/906; G06F 16/908
See application file for complete search history.

(56) References Cited

U.S. PATENT DOCUMENTS

| | | | | |
|---|---|---|---|---|
| 9,715,549 | B1 * | 7/2017 | Hill | G06F 16/951 |
| 12,056,200 | B2 | 8/2024 | Chandrashekar et al. | |
| 2005/0210297 | A1 | 9/2005 | Wu et al. | |
| 2010/0088726 | A1 | 4/2010 | Curtis et al. | |
| 2012/0216102 | A1 * | 8/2012 | Malla | G06F 40/12 715/206 |
| 2017/0329859 | A1 | 11/2017 | Ploeg et al. | |

(Continued)

OTHER PUBLICATIONS

PCT International Search Report of International Application No. PCT/US2021/064635, dated Apr. 19, 2022 (10 Pages).

*Primary Examiner* — Sanchita Roy
(74) *Attorney, Agent, or Firm* — HG LAW LLP

(57) ABSTRACT

Systems and methods are disclosed for providing content by generating a bookmark data structure for a topic based on determining retrieval of a first content item related to the topic, of a first content type. In response to determining retrieval of the first content item, the system may add the first content item to the bookmark data structure for the topic. The system may then determine retrieval of a second content item related to the topic, of a second content type and, in response to determining retrieval of the second content item, the system may add the second content item to the bookmark data structure for the topic. The system may generate, for display in a user interface (UI), a menu based on the data structure, with interactive UI elements that provide preview and/or access to the content item when interaction with the UI element is detected.

20 Claims, 7 Drawing Sheets

(56) References Cited

U.S. PATENT DOCUMENTS

| | | | | |
|---|---|---|---|---|
| 2018/0052939 | A1* | 2/2018 | Chao .................. | G06F 16/9562 |
| 2019/0340302 | A1* | 11/2019 | Murdock ............ | G06F 16/9535 |
| 2023/0004615 | A1 | 1/2023 | Chandrashekar et al. | |

* cited by examiner

700

SYSTEMS AND METHODS OF ORGANIZING AND PROVIDING BOOKMARKED CONTENT

CROSS-REFERENCE TO RELATED APPLICATION

This application is a continuation of U.S. patent application Ser. No. 17/363,331, filed Jun. 30, 2021. The disclosure of referenced application is hereby incorporated by reference herein in its entirety.

BACKGROUND

The present disclosure relates to providing content, and more particularly to systems and related processes for organizing and providing bookmarked content in user interfaces.

SUMMARY

User interfaces, e.g., in applications and operating systems, may track viewing and browsing histories for each user; however, the content previously accessed is not organized and presented in an accessible manner. Researching one or more topics not only requires searching and browsing for related content, but typically requires manually bookmarking and/or recording of how and where to access any found content related to the one or more topics. This is particularly problematic when the user needs access to bookmarks across different types of content (e.g., websites, video, app interfaces, etc.). Accordingly, an improved user interface is needed to identify topic-related content as it is viewed, organize the content as bookmarks for future access, and quickly provide the bookmarks for different types of content in an easily recognizable way using, e.g., a single view in the user interface.

A considerable amount of content is available for consumption, and this content is in a competition for potential audiences to both start and complete the content. Not only does content, such as video, animation, music, audiobooks, ebooks, playlists, podcasts, images, slideshows, games, text, and other media have to attract an audience; content must keep and sustain an audience. With competing content readily available, a content item has limited time to make an audience feel comfortable before an audience may decide to move on to other content.

Finding or re-finding that content is not always straightforward. Devices facilitate delivery of content for consumption at any time, as well as nearly in any place, which does not help to increase tolerance for content falling outside of an audience's usual preferences. Abilities of devices to provide content to a content consumer are often enhanced with the utilization of advanced hardware with increased memory and fast processors in devices. Devices such as computers, telephones, smartphones, tablets, smartwatches, speakers/microphones (e.g., with a virtual assistant), activity trackers, e-readers, voice-controlled devices, servers, televisions, digital content systems, video game consoles, and other internet-enabled appliances can provide and deliver content almost instantly.

Content delivery systems may use, for example, interactive content guidance applications to recommend content and facilitate content selection. Typically, viewer preferences are associated with a profile or an account such as a viewer profile, user profile, user account, subscriber profile, or a subscriber account. As used herein, "user" may be used as an equivalent to viewer, user account, subscriber account, or other account with content provider systems and/or services. Preferences may be stored as part of a viewer profile and may be referred to as a user profile. A user profile may be stored in the cloud (e.g., a remote secure server) and accessed by interactive content guidance applications initiated by a viewer (e.g., log-in). Profiles may store all types of content consumed and of various content types. For instance, profiles may include viewing and browsing histories of websites, web pages, books, audio, articles, posts, video, and other media. Browsing history may be stored as part of a viewing history (e.g., as part of a profile) and may be referred to as a user history. In some cases, profiles may be stored as part of virtual cloud drives, e.g., a digital briefcase or a cloud storage locker named "My Stuff."

Tracking browsing and/or consumption history via profiles may be valuable to both a service and a viewer. By tracking content consumed by a viewer, an interactive content guidance application may suggest another program based on similarities (or differences) with previously consumed content. For a content delivery service, tracking a viewing history may generate valuable data that can be used to aid in content recommendation algorithms. With a user history, an interactive content guidance application may indicate content that a viewer has already consumed or has yet to consume. For instance, a user may review his user history to identify content, e.g., a webpage or video, consumed at a particular date or time.

In existing approaches, identifying a previously viewed content item within a user history is not an easy task. Often, it may be a manual task of scrolling through lists of consumed content over a period of hours or days. A user can easily misremember the time or date that a content item may have been accessed. The user history interface itself does not typically make a task to review and re-identify a content item easy. Often, the user history interface may only offer a web address or (too) few words of description to identify a previously accessed content item. At best, the content items may be organized by a date and time.

For instance, searching for and collecting content to cook or prepare a multicourse dinner, planned for the following week, may guide a user to browse various webpages, videos, blogs, social media posts and other content about a variety of foods for appetizers, salads, breads, main courses, and desserts. When it is time to cook and prepare the meal, recapturing the best recipes, videos, guides, and tips is hardly an insignificant manual task. There exists a need to identify topic-related content as it is viewed, organize the content as bookmarks for future access, and quickly provide the bookmarks in an easily recognizable way.

A similar need may arise, for instance, when a person is researching one or more topics such as World War II, network cloud services, gardening with Monstera plants, or neural networks. For example, a user may be reading new articles on cloud web services and then notice that her plant needs pruning. A user may be reading a chapter of an eBook on building artificial intelligence when he realizes he needs to record an interview with a Pearl Harbor survivor that appears on television. Users may be researching various topics at different intensity levels and still want to collect their research in a simple, automated manner.

One approach may be to rely on a user history that uses a search and/or filter of previously accessed resources. This approach may help in some situations but depends too much on human memory to pick out keywords and/or times. For instance, searching a user history for recipes may require a user remembering keywords for each course. A user history may include content accessed over several days, weeks, months, or more. A user may research recipes one or two weeks ahead of an important dinner party. In the meantime, a user may completely forget to re-investigate a good recipe for crème brûlée that was found for a dessert course. Dessert is difficult to forget for many people; still, forgetting to search specifically for "crème brûlée" in a user history, in order to relocate an excellent recipe, may lead to at least one missing dessert at a dinner party. Likewise, preparation for an exam may be incomplete without recalling a proper keyword to bring back a valuable study resource.

An approach may involve manual selection of favorites or bookmarks. For instance, as a user is browsing videos (or websites), the user would be required to "favorite" or "bookmark" each content item found to be relevant and/or notable. This requires too much manual work by the user. A user may forget to bookmark an important video on D-Day that he wanted to show to a young student learning about the era. A user may see a dessert recipe and quickly click past a very relevant video for making spaghetti, forgetting to bookmark the video. Weeks later, when the user is sharing research with the young student or preparing a pasta dinner, missing the bookmark may mean missing content (or wasted time tracking down the right content). There exists a need to automatedly tag content items as they are browsed and store pointers to the content in an organized and easily accessible manner.

Described herein are systems or methods of providing content, e.g., as part of a smart bookmark system that collects consumed resources of different type related to a topic in a data structure and presents the bookmarks from the data structure in an accessible, recognizable manner. Automatic recording and collection of content as bookmarks, e.g., in a bookmark structure that is related to an identified topic or subtopic, may allow easy storage, recall, navigation, preview, and recommendation of content. Displaying such bookmarks from the bookmark structure(s) may take forms like trees, hierarchies, menus, mind-maps, linked lists, charts and graphs, and various other presentations and previews of bookmarked content. In some embodiments, a summary or slideshow of a topic or subtopic may be generated from the bookmarks in the data structure.

Some embodiments may utilize a bookmark engine to perform one or more parts of the systems and methods of providing content, e.g., as part of a content delivery platform or interactive content guidance application, stored and executed by one or more of the processors and memory of a device and/or server such as those depicted in FIGS. 6 and 7. For instance, a bookmark engine may run on a server of a content delivery platform or a streaming service. A bookmark engine may run on a component of a television, set-top box, computer, smartphone, tablet, or other device able to access a content delivery network and/or the internet.

Described herein are systems or methods of organizing content in a data structure. For instance, a bookmark engine may generate a bookmark data structure for a topic and determine retrieval of a first content item related to the topic, of a first content type. Then, in response to determining retrieval of the first content item, the bookmark engine may add the first content item to the bookmark data structure for the topic. The bookmark engine may then determine retrieval of a second content item related to the topic, of a second content type and, in response to determining retrieval of the second content item, the bookmark engine may add the second content item to the bookmark data structure for the topic.

In some embodiments, a bookmark engine may generate, for display in a user interface (UI), a menu based on the data structure, the menu comprising a first UI element (e.g., for a first content item) and a second UI element (e.g., second content item). In some embodiment, when interaction with the first UI element is detected, access to the first content item of the first content type may be provided, and when interaction with the second UI element is detected, access to the second content item of the second content type is provided. In some embodiments, for example, the first UI element and the second UI element may be displayed in an order based on corresponding metadata such as time published, content type, and/or time of retrieval.

Some embodiments may include capabilities to add a content item to the bookmark data structure for the topic with a uniform resource locator (URL) for the content item and provide access to the content item by opening the URL to the content item, e.g., when a UI element is selected or hovered over. In some embodiments, access to first content item may comprise displaying a preview of the content item. Some embodiments, for instance, may comprise an image of the content item with a portion of the image highlighted or annotated, e.g., as a preview. The privier portion may vary based on type of bookmarked content. For example, a bookmark to a website may include a portion of the website; a bookmark to a video may feature several frames of that video (e.g., in GIF or MP4 format); a bookmark to an app may show a key portion of an app interface; and a bookmark to audio may preview a short audio clip. Some embodiments may store pointers to content types such as a webpage, website, search results, blog, ebook, podcast, audio file, on-demand video, streaming video, and/or recorded video. Some embodiments may store and/or use links to different content types for different content items in a bookmark data structure.

In some embodiments, a bookmark engine may also determine a retrieval of a third content item related to a new topic and unrelated to a first topic (e.g., of the first two content items) and, in response to determining retrieval of the third content item, generate a new bookmark data structure for the new topic and add the third content item to the new bookmark data structure for the new topic.

In some embodiments, a bookmark engine may determine retrieval of the first content item by recording a timestamp, and adding the first bookmarked content item to the bookmark data structure further comprises adding the timestamp. In some embodiments, a bookmark engine may determine retrieval of the first content item by a user, e.g., saving, selecting as a bookmark, instructing to record, highlighting text or graphics, and/or printing. For instance, in some embodiments, a content type may be a recorded video, and determining retrieval of the content item may be based on instructions to record at least a portion of a video related to a topic. In some cases, a content type may be a webpage, and determining retrieval of the content item may be based on detection of a user highlighting text.

Some embodiments may include a bookmark mode. For instance, generating a bookmark data structure for a topic may be performed when a user explicitly enables the bookmark mode. In some embodiments, generating a bookmark data structure for a topic may be performed in response to user enablement of a bookmark mode. In some embodiments, generating a bookmark data structure for the topic may be performed in response to a user accessing a plurality of content items related to the topic in a certain time period (e.g., in two hours, one day, five days, etc.), such as when the plurality becomes greater than or equal to a predetermined threshold (e.g., one item, three items, or 7 items).

In some embodiments, a bookmark engine may determine retrieval of a content item related to a topic by determining a user accessing a plurality of content items related to the topic, and, if/when the plurality greater than or equal to a predetermined threshold for the topic (e.g., two items, five items, or ten items), add the content item(s) to the bookmark data structure for the topic. In some embodiments, a bookmark engine may add a content item to the bookmark data structure for the topic by prompting a user to identify a bookmarked segment in the content item, receiving an input of the bookmarked segment in response to the prompt, and storing the bookmarked segment in the bookmark data structure for the topic with the content item. For example, when the system is operating in bookmark mode related to one or more specific topics and the user requests a bookmark, the system may generate for display a prompt for the user to select a desired portion of content (e.g., part of a web page, or a segment of a video). In some embodiments, a selected portion may later be used to generate a preview when a user interacts with the created bookmark.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Devices may be designed to facilitate content consumption. Content like video, animation, music, audiobooks, ebooks, playlists, podcasts, images, slideshows, games, text, and other media may be consumed by users at any time, as well as nearly in any place. Abilities of devices to provide content to a content consumer are often enhanced with the utilization of advanced hardware with increased memory and fast processors in devices. Devices—e.g., computers, telephones, smartphones, tablets, smartwatches, microphones (e.g., with a virtual assistant), activity trackers, e-readers, voice-controlled devices, servers, televisions, digital content systems, video game consoles, and other internet-enabled appliances—can provide and deliver content almost instantly.

Interactive content guidance applications may take various forms, such as interactive television program guides, electronic program guides and/or user interfaces, which may allow users to navigate among and locate many types of content including conventional television programming (provided via broadcast, cable, fiber optics, satellite, internet (IPTV), or other means) and recorded programs (e.g., DVRs) as well as pay-per-view programs, on-demand programs (e.g., video-on-demand systems), internet content (e.g., streaming media, downloadable content, webcasts, shared social media content, etc.), music, audiobooks, websites, animations, podcasts, (video) blogs, ebooks, and/or other types of media and content. An interactive guidance application may comprise an internet browser, or web browser functions, to facilitate and track content access via the internet.

In some embodiments, an interactive guidance application may be provided as a stand-alone application, an operating system, online application (e.g., provided via a website) performed on a computer, tablet, smartphone, or other mobile devices. A content guidance application may facilitate access to content available through a television, or through one or more devices, or bring together content available both through a television and through internet-connected devices using interactive guidance. Various devices and platforms that may implement content guidance applications are described in more detail below.

Media devices, content delivery systems, and interactive content guidance applications may utilize input from various sources including remote controls, keyboards, microphones, video and motion capture, touchscreens, and others. For instance, a remote control may use a Bluetooth connection to a television or set-top box to transmit signals to move a cursor.

Figure 1:
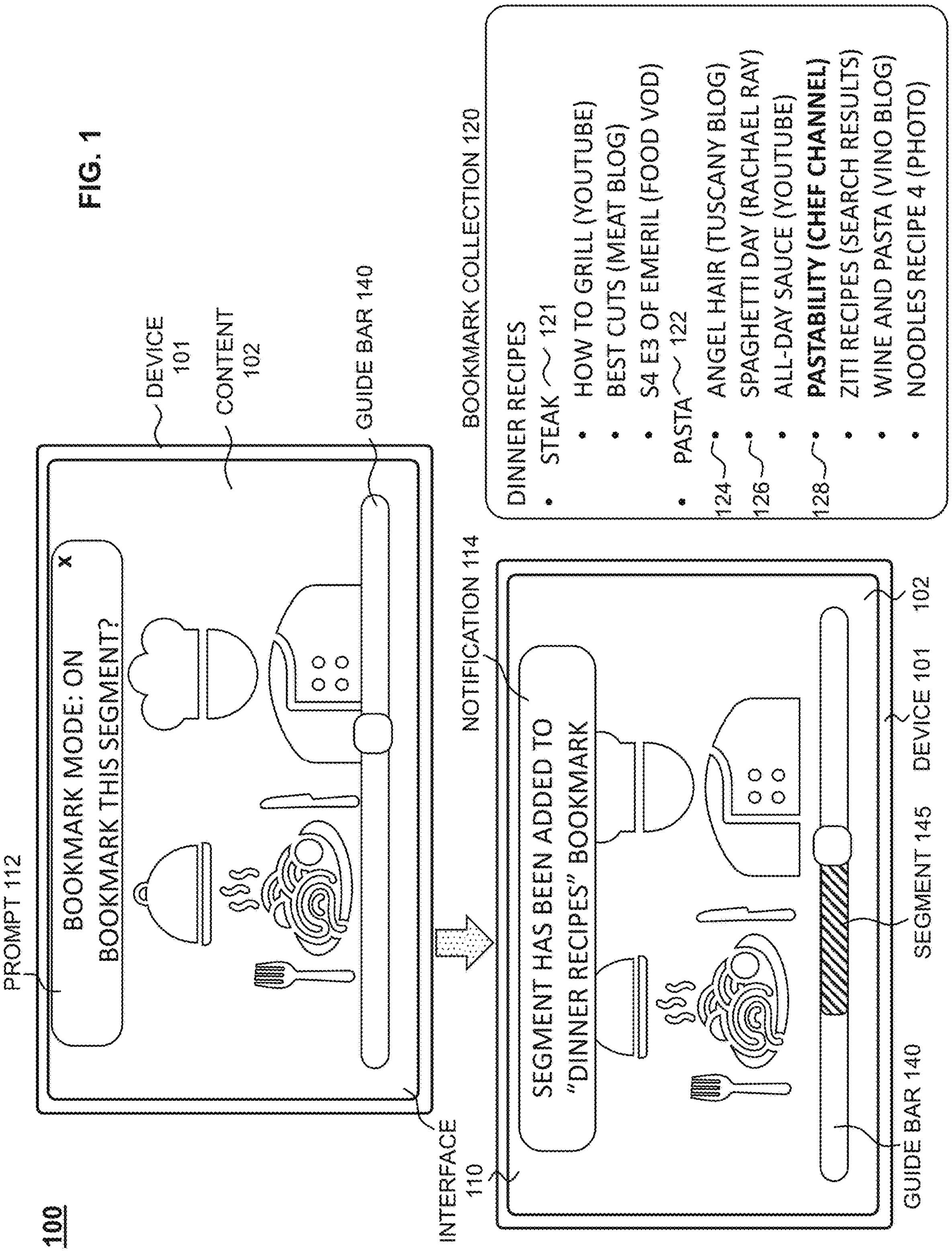
FIG. 1 depicts an illustrative user interface in bookmark mode adding a segment, in accordance with some embodiments of the disclosure.

FIG. 1 depicts an illustrative user interface in bookmark mode adding a segment, in accordance with some embodiments of the disclosure. Scenario 100 of FIG. 1 illustrates a user interface, interface 110, of an interactive content guidance application presenting content 102. Scenario 100 of FIG. 1 also illustrates a user interface, interface 110, using bookmark mode. In scenario 100, interface 110 is presented on a screen of device 101. By way of a non-limiting example, scenario 100 depicts bookmarking a segment of a television program and storing the bookmark in a bookmark data structure. For instance, interface 110 may present a prompt to bookmark a segment and present a notification that the segment has been bookmarked to a bookmark collection for a topic.

Figure 5:
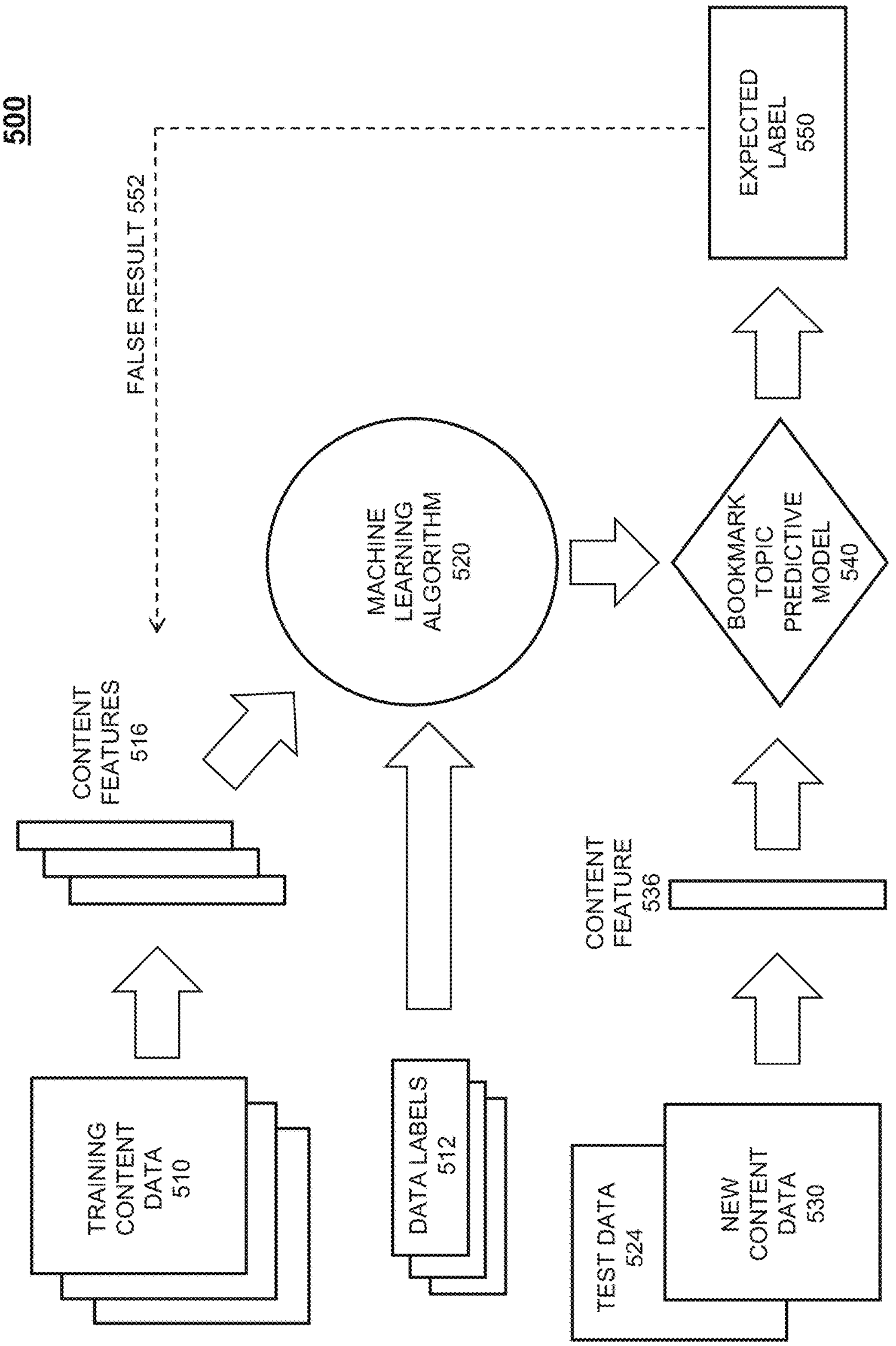
FIG. 5 depicts an illustrative flow diagram of a process for training a machine learning model to label bookmarked content by topic(s), in accordance with some embodiments of the disclosure.
Figure 6:
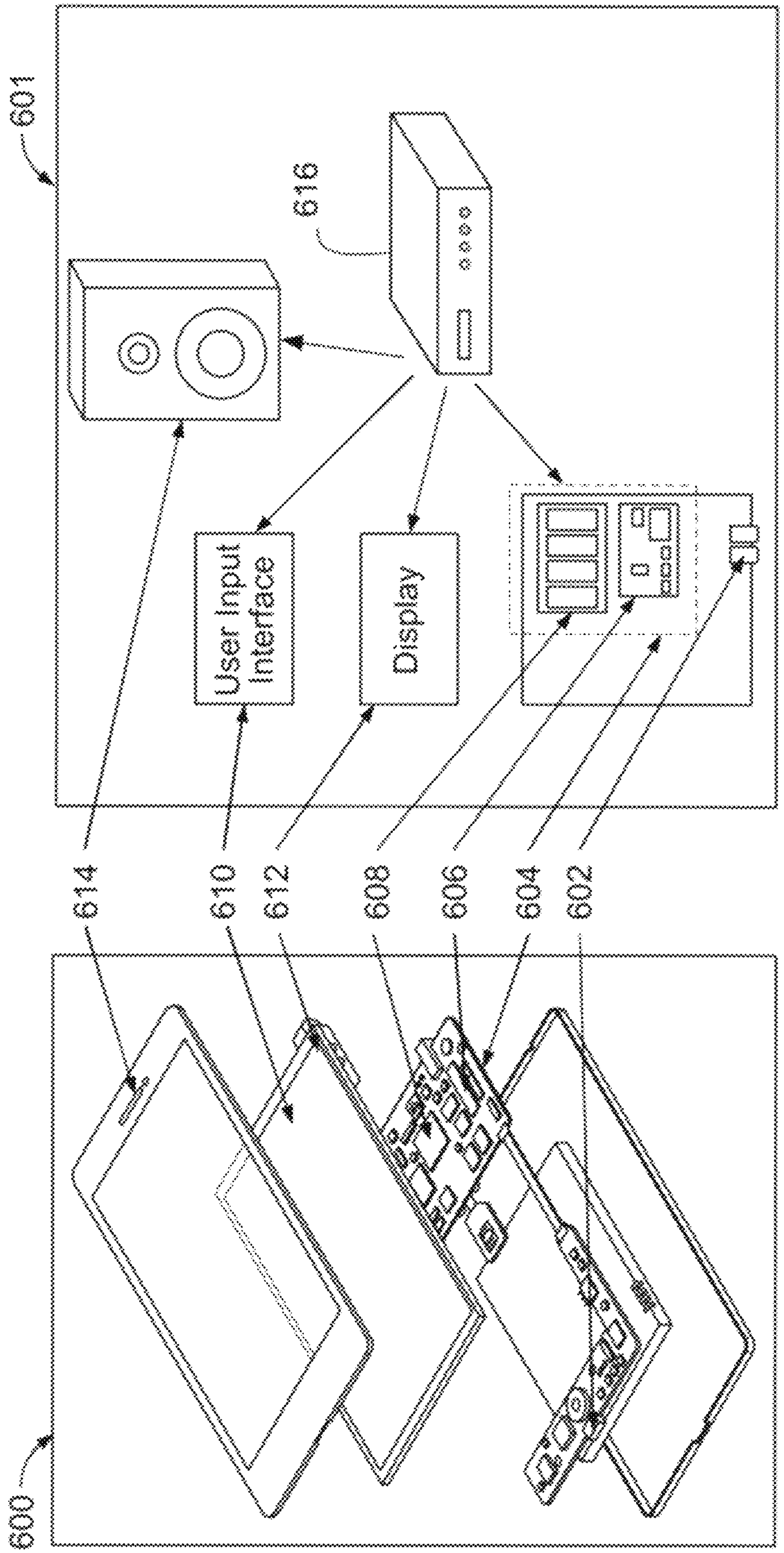
FIG. 6 is a diagram of illustrative devices, in accordance with some embodiments of the disclosure.
Figure 7:
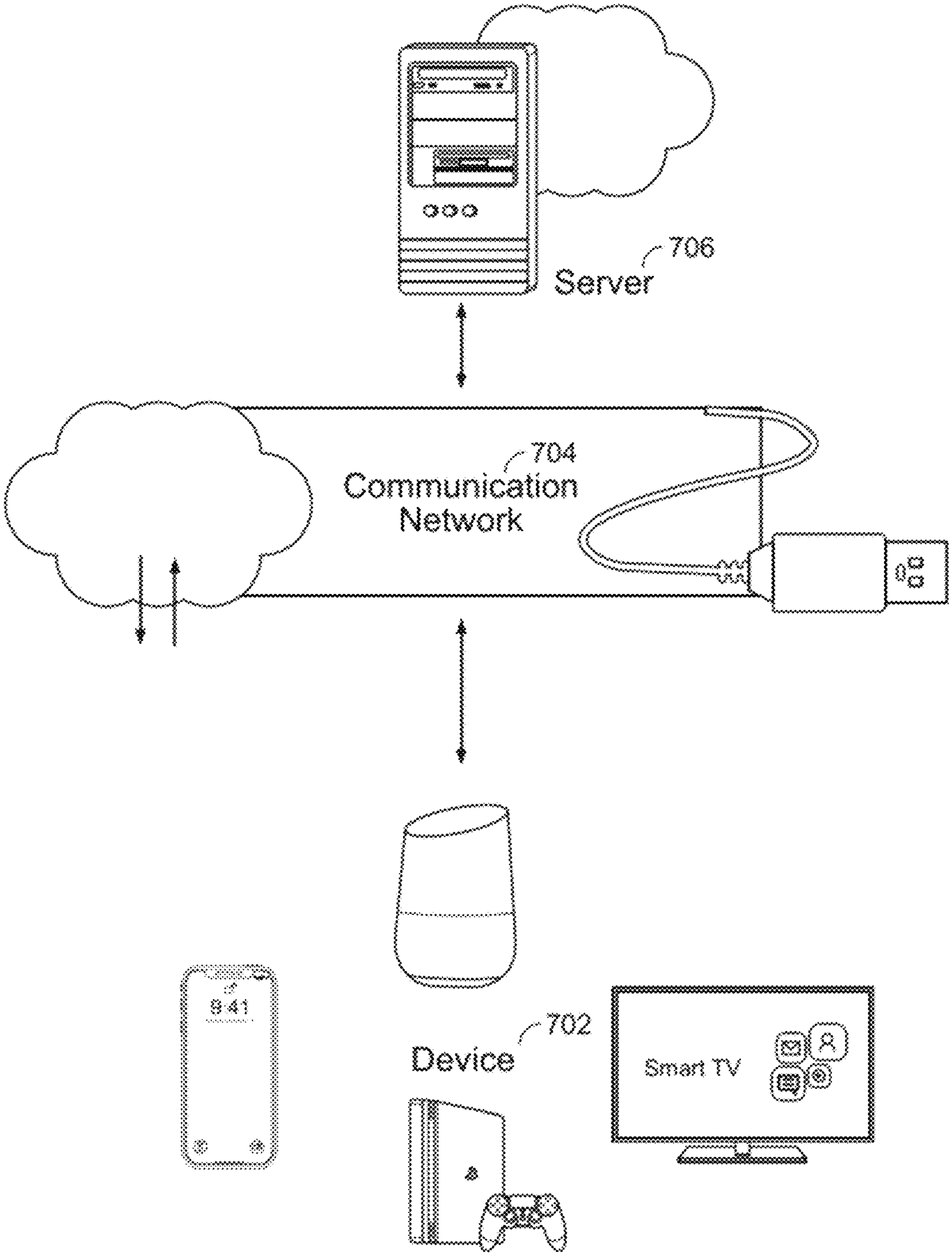
FIG. 7 is a diagram of an illustrative system, in accordance with some embodiments of the disclosure.

Exemplary processes such as generating and organizing bookmarks are described in FIG. 5 and may be carried out by a bookmark engine, e.g., as part of a content delivery platform or interactive content guidance application, stored and executed by one or more of the processors and memory of a device and/or server such as device 101 and devices depicted in FIGS. 6 and 7. In some embodiments, interface 110 may comprise a bookmark engine or function as a bookmark engine.

Interface 110 depicts providing content 102 for consumption via interface 110 on device 101. Device 101 may be, for instance, a television, set-top box, computer, smartphone, tablet, or other device able to access a content delivery network that provides interface 110 and content 102. Interface 110 may be a part of a content delivery platform or interactive content guidance application, stored and executed by one or more of the processors and memory of a device and/or server such as those depicted in FIGS. 6 and 7. Content 102 may be delivered via a content delivery system using one or more of cable, fiber, satellite, antenna, streaming over IP, wireless, or other content delivery methods. Content 102 may be captured live for live broadcast and/or streaming. For instance, content 102 may be a cooking show such as a show "Pastability" available via, e.g., Chef Channel, featuring a live demonstration of preparing food (e.g., spaghetti and meatballs). Interface 110, for example, displays a guide bar, e.g., guide bar 140, in the lower portion of the screen for tracking progress of playback of content 102.

Interface 110, for example, displays a prompt, prompt 112, at the top of the screen. In some embodiments, interface 110 may ask a viewer via prompt 112 if the viewer wants to bookmark a segment. For instance, prompt 112 says "BOOKMARK MODE: ON" indicating a that a bookmark mode has been turned on (e.g., by the viewer) and "BOOKMARK THIS SEGMENT?" inquiring if a viewer wants to bookmark the currently viewed segment.

In some embodiments, interface 110 may use a "bookmark mode" to designate an appropriate time to inquire or suggest when to automatically add content to a bookmark data structure. For instance, a bookmark engine may inquire if a viewer wants to bookmark a content item only if bookmark mode is turned on. In some embodiments, bookmark mode may have an on/off toggle in a viewer profile or viewer settings. In some embodiments, bookmark mode may be turned on by a trigger such as a user input (e.g., from a remote control, touchscreen, microphone, etc.) indicating a trick-play function, a saving function, a record function, and/or a bookmark function. For instance, bookmark mode may be activated by a voice command to bookmark a first content item (or segment). In some embodiments, bookmark mode may be activated by remote control input such as instructions to record a show or segment. In some embodiments, bookmark mode may be enabled by pausing a program for a predetermined time duration, e.g., 5 seconds. In some cases, bookmark mode may be enabled by highlighting text, such as a recipe or article passage.

In some embodiments, bookmark mode may be turned on or off for individual topics. For instance, bookmark mode may be turned on for a food topic, and content or segments that are related to food are automatically saved to relevant bookmark structure(s). Likewise, in some embodiments, bookmark mode may be turned off for a topic, such as "'90s Music," and related content or segments are not actively saved to relevant bookmark structure(s) without bookmark mode being reactivated.

In scenario 100, bookmark mode is depicted as activated for interface 110 as depicted in prompt 112. Since bookmark mode is turned "on" in scenario 100, prompt 112 asks whether the viewer wants to bookmark this segment—e.g., save the segment to a bookmark data structure. In some embodiments, a viewer may respond positively to prompt 112 by inputting "YES," "OK," or "Enter," e.g., via a remote control or touchscreen. In some embodiments, a viewer may respond positively to prompt 112 by clicking on or selecting a word in the prompt, e.g., via a remote control or touchscreen. In some embodiments, a viewer may respond negatively to prompt 112 by inputting "No," "Exit," or selecting a close button such as the "X" in the corner of prompt 112, e.g., via a remote control or touchscreen. In some embodiments, a viewer may not respond to prompt 112 and a timeout function returns a default response. For instance, if prompt 112 is not answered in 5 seconds a default "Yes" response may be used. In some cases, a user profile may store a preference for a timeout response when in bookmark mode.

In some embodiments, a prompt, such as prompt 112, may request a user to select a portion of content that is desired. For instance, if bookmarking a webpage or blog, a prompt may request a viewer to highlight a passage of text to save with the bookmark data structure. In some embodiments, an editable, pre-selected portion may be highlighted, e.g., based on an identification of a topic, screen position, keywords, and/or other means of identifying relevant information. In some embodiments, a prompt may request a viewer to set bounds of a content segment, e.g., moving/dragging pointers indicating a beginning and/or end of a key portion of a video. In some cases, a video segment may be pre-selected, e.g., based on time, scene, commercial breaks, etc., and a viewer permitted to adjust start and/or end time limits.

In a next screen of scenario 100, interface 110 includes notification 114, and guide bar 140 includes segment 145 as highlighted. The bottom screen of scenario 100, for example, depicts a positive response to prompt 112. For instance, notification 114 of interface 110 says "Segment has been added to 'Dinner Recipes' bookmark." In some embodiments, a highlighted portion of a guide bar may indicate that a segment of a content item may be recorded/saved to a bookmark data structure for a relevant topic. The bottom screen of scenario 100 also depicts, for example, a highlighted portion of guide bar 140, e.g., segment 145. Segment 145 may indicate a portion of content 102 that was recorded or saved as relevant to a topic of a bookmark data structure. In some embodiments, a segment may be recorded to a hard drive or a cloud server and a pointer to the stored segment saved to a bookmark data structure for a relevant topic. In some embodiments, a notification may identify a topic or subtopic for content stored in a bookmark data structure. For instance, notification 114 indicates that a segment, segment 145, was added to a topic "Dinner Recipes" of a bookmark data structure. In some embodiments, a topic such as "Dinner Recipes" may be a part of a larger data structure for all bookmarks. In some embodiments, a topic such as "Dinner Recipes" may be a part of a larger data structure for all bookmarks related to food and recipes. In some embodiments, a topic such as "Dinner Recipes" may be a separate data structure.

Scenario 100 further depicts an exemplary bookmark data structure illustrated as bookmark collection 120. Bookmark collection 120 may appear on-screen or be stored behind the scenes. In some embodiments, a bookmark data structure may comprise a hierarchical data structure, trees, linked lists, queues, playlists, matrices, tables, blockchains, and/or various other data structures. A bookmark data structure may include, for instance, several levels of topics, subtopics, sub-subtopics, and other linkage among topics. In some embodiments, a bookmark data structure may be stored in or with a user profile, e.g., at a server in a content delivery network. In some embodiments, a bookmark data structure may be stored, for instance, at an encrypted cloud server. Moreover, in some embodiments, a bookmark data structure may be stored at a user device. For instance, a user profile and/or history may need to be kept private, e.g., encrypted and stored only at one user device.

In scenario 100, a bookmark data structure is depicted as bookmark collection 120 with a collection of "Dinner Recipes" for several content items of various content types such as blogs, articles, videos, programs, search results, photographs, etc. In some embodiments, a bookmark data structure may comprise several topics or subtopics. For instance, bookmark collection 120 comprises "Dinner Recipes" as a topic with subtopics of steak subtopic 121 and pasta subtopic 122. Each of steak subtopic 121 and pasta subtopic 122, within the bookmark data structure, is depicted to comprise bookmarks to several content items of various content types. Pasta subtopic 122, for instance, may include bookmarks 124, 126, and 128. Bookmark 124 indicates a content item titled "Angel Hair" from "Tuscany Blog" was saved to the bookmark data structure. For instance, "Angel Hair" may be a recipe highlighted and/or saved from a blog called "Tuscany Blog."

Also depicted in bookmark collection 120, bookmark 126 indicates a content item titled "Spaghetti Day" from "Rachael Ray" was saved to the bookmark data structure. For instance, "Spaghetti Day" may be television program (or a segment of a program) from the TV show "Rachael Ray." Such a segment may be a recorded segment on a digital video recording (DVR) device or a denoted portion of a streaming video or video-on-demand (VOD) program. In some embodiments, "Rachael Ray" may be accessible in multiple manners such as cable, over-the-top (OTT) streaming platform, recording, and/or VOD, and a bookmark may point to one or more options.

For pasta subtopic 122, other exemplary content items saved to the bookmark data structure are, e.g., "All-Day Sauce," a video from YouTube, "Ziti Recipes" search results; a "Wine and Pasta" article from a blog called Vino Blog; and a photograph of a recipe, "Noodles Recipe 4." For steak subtopic 121, other exemplary content items saved to the bookmark data structure are, e.g., "How to Grill," a user video from YouTube; a blog post titled "Best Cuts" from Meat Blog; and a television program, "Season 4, Episode 3" of "Emeril," available from the Food Network streaming app.

Some embodiments may indicate a newly added bookmark. For instance, in pasta subtopic 122 of bookmark collection 120, bookmark 128 indicates a television program, "Pastability," that appeared on the Chef Channel. As depicted in scenario 100, content 102 is a television program, e.g., "Pastability" on the Chef Channel, and segment 145 is a recorded portion of the television program, e.g., with a live demonstration of preparing spaghetti and meatballs. In some embodiments, when prompt 112 is responded to positively, interface 110 may identify a segment for recording. For instance, interface 110 may be recording to a buffer for a duration, e.g., 20 minutes, and when asked to bookmark a segment, can record for a period of time and save a segment. In some embodiments, such a period of time may be the duration of the buffer, which is then saved to a hard drive or cloud recordings database. In some embodiments, such a period of time may be a predetermined amount of time stored in a user profile. In some embodiments, such a period of time may be a designated scene or scenes, e.g., as identified by content metadata. In some embodiments, such a period of time may be until a denoted point in a program such as a start or ending of a commercial break.

Figure 2:
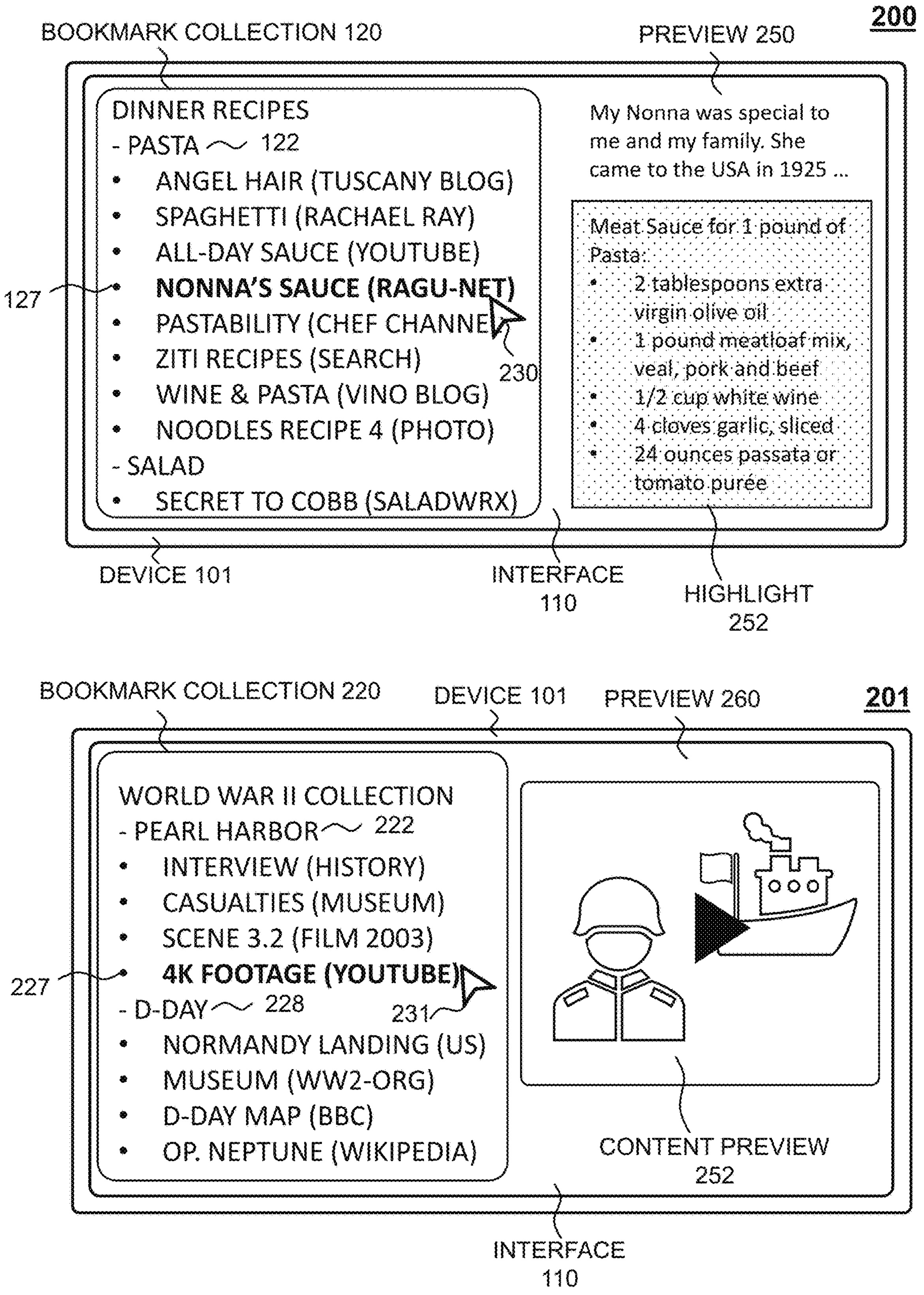
FIG. 2 depicts an illustrative user interface presenting bookmark previews as part of a bookmark collection, in accordance with some embodiments of the disclosure.

FIG. 2 depicts an illustrative user interface presenting bookmark previews as part of a bookmark collection, in accordance with some embodiments of the disclosure. Each of scenario 200 and scenario 201 depicts a user interface, interface 110, providing bookmark information, e.g., bookmark collection 120 and/or bookmark collection 220, from a bookmark data structure with a corresponding preview, e.g., preview 250 and preview 260, of a selected bookmark of a content item.

Interface 110 of FIG. 2 depicts providing content for consumption on device 101. Device 101 may be, for instance, a television, set-top box, computer, smartphone, tablet, or other device able to access a content delivery network that provides interface 110 and content. Interface 110 may be a part of a content delivery platform or interactive content guidance application, stored and executed by one or more of the processors and memory of a device and/or server such as those depicted in FIGS. 6 and 7. Content may be accessed and delivered via a content delivery system using one or more of cable, fiber, satellite, antenna, streaming over IP, wireless, or other content delivery methods. In some embodiments, interface 110 may comprise a bookmark engine or function as a bookmark engine.

Scenario 200 features a bookmark portion and preview portion displayed by interface 110 on device 101. In some embodiments, each word or graphic of interface 110 may be an interactive, selectable UI element. For instance, interface 110 provides a user interface with, at least, a portion of a bookmark data structure as bookmark collection 120. Each of the UI elements of bookmark collection 120 may be interactive and facilitate access to the corresponding content item. In some embodiments, interacting with a UI element may trigger a preview to appear such as, e.g., preview 250. For instance, in scenario 200, as cursor 230 hovers over bookmark 127, e.g., "NONNA'S SAUCE" from "RAGU-NET," a preview of the linked blog appears as preview 250. In some embodiments, preview 250 may allow a viewer to quickly identify and remember what content (and content type) the bookmark points to.

Figure 4:
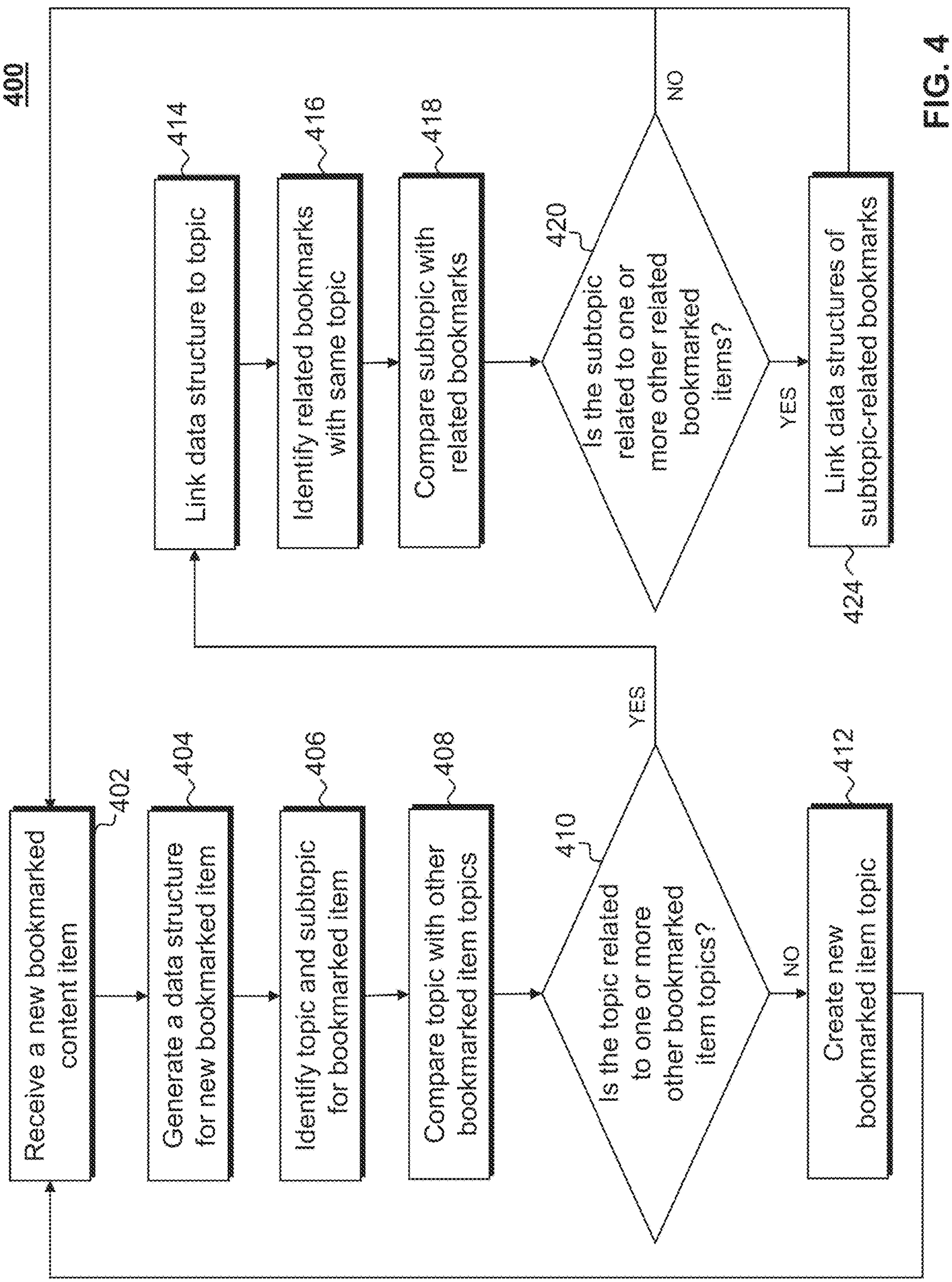
FIG. 4 depicts an illustrative flowchart of a process for generating and organizing bookmarks, in accordance with some embodiments of the disclosure.

In some embodiments, a preview may include a highlighted portion of text. For instance, in scenario 200, a recipe is presented in highlight 252. Outside of highlight 252, still in preview 250, is text describing the author's "Nonna," which is not relevant to the topic of "Dinner Recipes" or the subtopic of "Pasta." A highlight may comprise a highlight, annotation, animation, or other feature to call attention to an important portion. In some embodiments, bookmarks data structures may be created when a user takes an action like inputting a record command or highlighting a portion of text. For instance, bookmark 127, with highlight 252, may be generated by a user highlighting a recipe for "meat sauce." Process 400 of FIG. 4 depicts an exemplary process for generating and linking bookmark data structures. In some embodiments, a bookmark engine will automatically highlight a relevant portion. For instance, a highlight or annotation may be applied to a content item based on user interaction, detected screen time, user eye tracking, crowd-sourced highlights from other viewers, data analysis, a trained predictive model, and/or other techniques of identifying relevant portions of text, graphics, and/or multimedia. In some embodiments, preview 250 may be interactive. In some embodiments, preview 250 may feature the full content alongside a bookmark collection.

Scenario 200 features bookmark collection 120 with several exemplary bookmarks. In some embodiments, bookmark collection 120 may be presented to reflect a hierarchical structure of a bookmark data structure. For instance, bookmark collection 120 comprises a topic of "Dinner Recipes" and subtopics of "Pasta" (subtopic 122) and "Salad." Subtopic 122, as depicted in scenario 200, features bookmarks for content, such as, a blog article titled "Angel Hair" from "Tuscany Blog," a video-on-demand titled "Spaghetti Day" from television program "Rachael Ray," a user-produced video from YouTube titled "All-Day Sauce," search results for "Ziti Recipes," a "Wine and Pasta" blog article from "Vino Blog," and a photograph of a recipe titled "Noodles Recipe 4." In scenario 200, interface 110 generates a preview for each bookmark as a cursor, e.g., cursor 230, hovers over the bookmark UI element. In some cases, a preview may be displayed when a bookmark element is selected or clicked, e.g., using a mouse, remote control, touchscreen, or other input.

Scenario 201 features a bookmark portion, bookmark collection 220, and a preview portion, preview 260, displayed by interface 110 on device 101. Interface 110 provides a user interface with, at least, a portion of a bookmark data structure as bookmark collection 220. Each of the UI elements of bookmark collection 220 may be interactive and facilitate access to the corresponding content item. In some embodiments, interacting with a UI element may trigger a preview to appear as, e.g., preview 260. For instance, in scenario 201, as cursor 231 hovers over bookmark 227, e.g., "4K Footage" of Pearl Harbor, from YouTube, a preview of the video appears as preview 260. In some embodiments, a preview may include a thumbnail, cover art, a still image, a segment/portion of a video, a trailer, and/or a whole video. In some embodiments, preview 260 may allow a viewer to quickly identify and remember what content (and content type) the bookmark points to. In some embodiments, the preview displays an image and waits for interaction before displaying a video. In some embodiments, a video or clip begins automatically on interaction with the bookmark UI element. In some embodiments, the video clip loops. In some embodiments, the video may be (automatically) displayed as full screen after a certain time of preview.

Scenario 201 features bookmark collection 220 with several exemplary bookmarks. In some embodiments, bookmark collection 220 may be presented to reflect a bookmark data structure. For instance, bookmark collection 220 comprises a topic of "World War II" and subtopics of "Pearl Harbor" (subtopic 222) and "D-Day" (subtopic 228). Subtopic 222 ("Pearl Harbor"), as depicted in scenario 201, features bookmarks for content, such as, a multimedia interview from History.com, a statistical table for casualties from the Pearl Harbor Museum website, a scene from Act 3, scene 2 of the 2003 film "Pearl Harbor," and a video with 4K footage from YouTube. Subtopic 228 ("D-Day"), as depicted in scenario 201, features bookmarks for content, such as a government-produced website on the Normandy Landing, a museum blog from a World War II organization, an interactive map from the BBC, and a dynamically changing Wikipedia article on "Operation Neptune." In scenario 201, interface 110 generates a preview for each bookmark as a cursor, e.g., cursor 231, hovers over the bookmark UI element or selects it. In some cases, a preview may be displayed when a bookmark element is selected or clicked, e.g., using a mouse, remote control, touchscreen, or other input.

Figure 3:
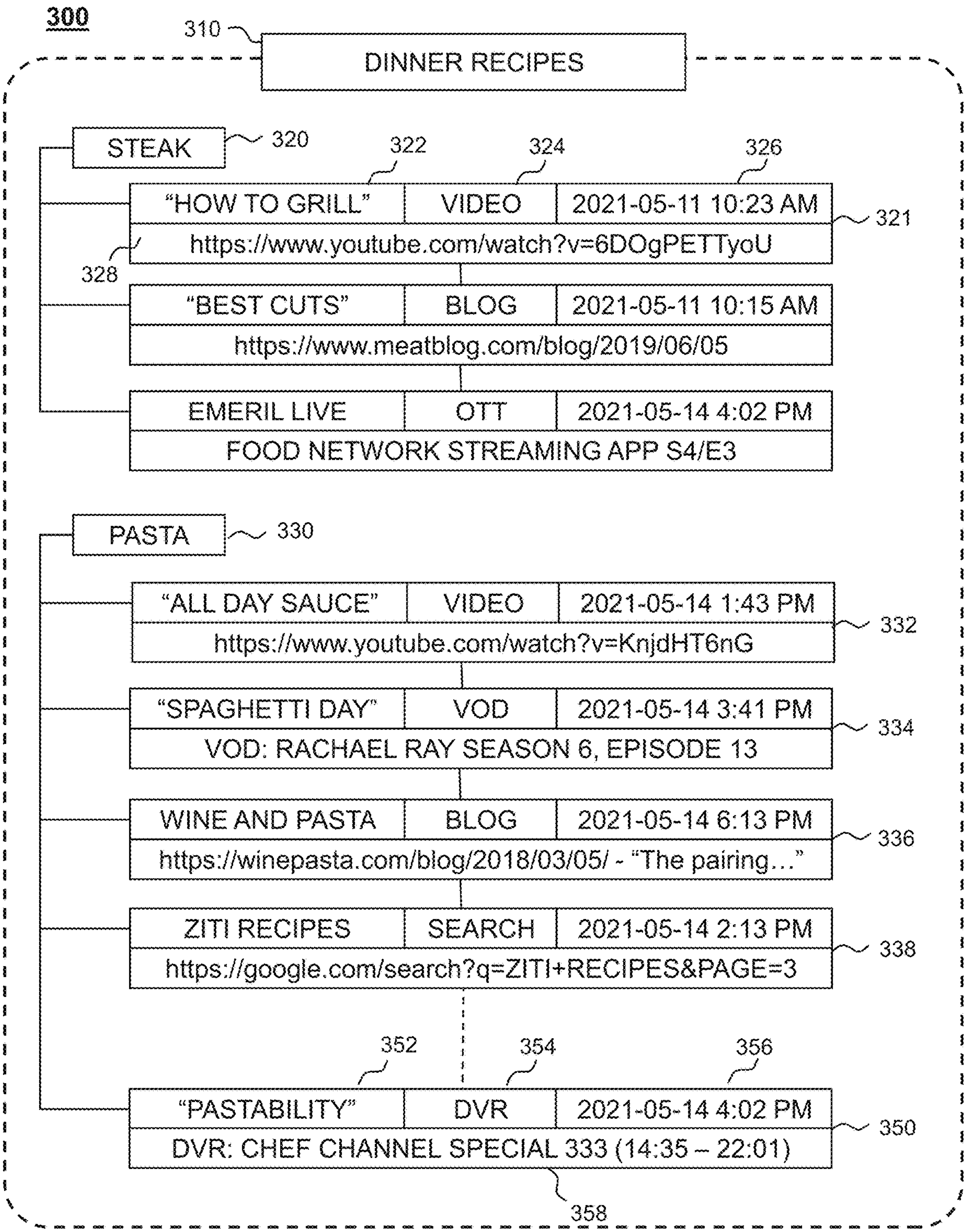
FIG. 3 depicts an illustrative data structure for organizing and presenting bookmarks, in accordance with some embodiments of the disclosure.

FIG. 3 depicts an illustrative data structure for organizing and presenting bookmarks, in accordance with some embodiments of the disclosure. Data structure 300 is an exemplary bookmark data structure for saving content items in a manner for organized display. A bookmark data structure may have one or more topics and subtopics. For example, data structure 300 of FIG. 3 depicts a topic, topic 310, as "Dinner Recipes." In some embodiments, data structure 300 may include subtopics. For instance, data structure 300 also depicts subtopic 320, "Steak," and subtopic 330, "Pasta." In data structure 300, the exemplary nodes linked with subtopic 320, "Steak," are considered to have a subtopic of or similar to "steak," with a topic of dinner recipes.

Within data structure 300 are nodes representing content items that have been saved to the bookmark data structure. Some embodiments may include capabilities to add a content item directly. Some embodiments may include capabilities to add a content item to the bookmark data structure for the topic with a uniform resource locator (URL). Some embodiments may use the URL for access to and/or a preview of content in a user interface, for example, by providing access to the content item via the URL to the content item when a UI element is selected or hovered over. A bookmark node may include information such as an identifier, title, content type, timestamp of creation, timestamp of access, and other metadata and/or information.

In some embodiments, such as data structure 300, exemplary node 321 of FIG. 3 may be considered a generated data structure for bookmarked item. Node 321 comprises title 322 (e.g., "How to Grill"), content type 324 (e.g., "Video"), timestamp 326 (e.g., "2021-05-11 10:23 AM"), and address 328 describing how/where the content item was or may be accessed (e.g., "https://www.youtube.com/watch?v=6DOgPETTyoU"). Node 321 is linked to topic 310, "Dinner Recipes," as shown by the dotted line, and linked to subtopic 320, "Steak," as shown by the connecting line(s). In some embodiments, an address may be a URL pointing to a content item. In some embodiments, an address may point to local or cloud storage. Nodes of exemplary data structure 300 may also include (or point to) other related information. In some embodiments, nodes may include previews such as images, thumbnails, clips, or text blurbs. In some embodiments, nodes may include instructions to access a content item and generate a preview when triggered. FIG. 2 depicts a user interface generating bookmark previews. In some embodiments, nodes may include user notes.

Pasta subtopic 330 of data structure 300 may be considered to correspond to pasta subtopic 122 of scenario 100, with exemplary content items saved to the bookmark data structure such as node 332, e.g., "All-Day Sauce," a video from YouTube; node 334, e.g., a television program "Spaghetti Day" from "Rachael Ray"; node 336, e.g., a "Wine And Pasta" article from a blog, "Vino Blog"; node 338, e.g., "Ziti Recipes" search results; and node 350, e.g., "Pastability." Steak subtopic 320 of data structure 300 may be considered to correspond to steak subtopic 121 of scenario 100, with exemplary content items saved to the bookmark data structure such as node 321, e.g., "How to Grill," a user video from YouTube; a blog post titled "Best Cuts" from Meat Blog; and a television program "Season 4, Episode 3" of "Emeril" available from the Food Network streaming app.

In some embodiments, node 350, depicted in FIG. 3, may be considered a newly generated data structure for a new bookmarked item. Node 350 comprises title 352 (e.g., "Pastability"), content type 354 (e.g., DVR), timestamp 356 (e.g., "2021-05-14 4:02 PM"), and address 358 (e.g., "DVR: CHEF CHANNEL SPECIAL 333 (14:35-22:01)"). For instance, node 350 may refer to segment 145 of content 102 depicted in scenario 100 of FIG. 1, which may be considered a newly recorded video segment and a newly bookmarked content item. Content 102, for example, may be considered a segment of "Pastability" available via, e.g., Chef Channel, featuring a live demonstration of preparing food (e.g., spaghetti and meatballs). As shown in scenario 100, when "bookmark mode" is turned on, a bookmark may be created for a relevant segment, which may be linked with a topic and subtopic in a bookmark data structure.

In data structure 300 of FIG. 3, nodes 332, 334, 336, 338, and 350 are also depicted as exemplary bookmark nodes. As depicted in FIG. 3, nodes 332, 334, 336, 338, and 350 are each linked to subtopic 330, "Pasta," and are considered to have a subtopic of or similar to "pasta." In some embodiments, the bookmark engine looks for nodes with related subtopics to link to the new bookmark node. For example, when generating node 350, e.g., a television program "Pastability," the referenced content item may be matched with, e.g., "Dinner Recipes" of topic 310 in data structure 300.

In some embodiments, such as data structure 300 of FIG. 3, nodes 332, 334, 336, 338 are each linked to subtopic 330, "Pasta." A subtopic of "pasta" for "Pastability" may be matched and linked with nodes with, e.g., "Pasta" of subtopic 330. In data structure 300, adding node 350 to data structure 300 includes linking to topic 310, as well as linking to nodes 332, 334, 336, 338, and other nodes with a subtopic of "pasta" for subtopic 330. structure 300. In some embodiments, links may not be made until a predetermined threshold number of bookmark entries with a matching subtopic are saved to the data structure. Process 400 of FIG. 4 depicts an exemplary process for generating and linking bookmark nodes.

FIG. 4 depicts an illustrative flowchart of a process for generating and organizing bookmarks, in accordance with some embodiments of the disclosure. There are many ways to generate, organize, and present bookmarks, and process 400 of FIG. 4 is an exemplary method generate and organize a bookmark data structure. For instance, a bookmarked content item may be related to a pre-established topic/subtopic, or a new topic may have to be generated.

Some embodiments may utilize a bookmark engine to perform one or more parts of process 400, e.g., as part of a content delivery platform or interactive content guidance application, stored and executed by one or more of the processors and memory of a device and/or server such as those depicted in FIGS. 6 and 7. For instance, a bookmark engine may run on a server of a content delivery platform like a streaming service. A bookmark engine may run on a component of a television, set-top box, computer, smartphone, tablet, or other device able to access a content delivery network.

At step 402, the bookmark engine receives a new bookmarked content item. For instance, segment 145 of content 102 depicted in scenario 100 of FIG. 1 may be considered a new bookmarked content item. Content 102, for example, may be considered a portion of "Pastability" available via, e.g., Chef Channel, featuring a live demonstration of preparing food (e.g., spaghetti and meatballs). In some embodiments, a content item may be received as a link or pointer to the content item as accessed via web and/or content delivery network.

At step 404, the bookmark engine generates a data structure for new bookmarked item. In some embodiments, a bookmark data structure may comprise a hierarchical data structure, trees, linked lists, queues, playlists, matrices, tables, blockchains, and/or various other data structures. For example, node 350 depicted in FIG. 3 may be considered a generated data structure for a newly bookmarked item. In scenario 300, node 350 comprises title 352, e.g., "Pastability," content type 354, timestamp 356, and address 358.

At step 406, the bookmark engine identifies a topic and/or subtopic for the bookmarked item. For instance, with a portion of content 102 depicted in scenario 100 of FIG. 1, e.g., "Pastability," a topic of "Dinner Recipes" and a subtopic of "Pasta" may be determined. Identifying a topic may be performed in several ways. Some embodiments may use a machine learning model to label a topic and/or subtopic for a content item. A machine learning model may be trained by a process such a process 500 as depicted in FIG. 5. In some embodiments, labeling of topics or subtopics may be performed with data analysis. In some embodiments, labeling of topics or subtopics may be accomplished with metadata. In some embodiments, labeling of topics or subtopics may be performed using keywords and/or internet searches. In some embodiments, content may be categorized or labeled with more than one topic.

At step 408, the bookmark engine compares the topic with other bookmarked item topics. For instance, a labeled content item topic of "pasta recipe" may be compared to topics already established in a bookmarking structure, such as "Dinner Recipes" or "World War II."

At step 410, the bookmark engine determines whether the topic is related to one or more other bookmarked item topics. For example, a topic of "Dinner Recipe" for "Pastability" may be matched with, e.g., "Dinner Recipes" of topic 310 depicted in data structure 300 of FIG. 3.

At step 412, the bookmark engine creates a new bookmarked item topic. For example, if there are no matches of a labeled topic for a content item, a new topic may be created. In some embodiments, a new topic may not be created until there are a predetermined number of unmatched content items with similar topics. For instance, if the only topics are "Dinner Recipes" and "World War II," but two content items relevant to gardening are generated, a new topic of "Gardening" may be generated. In some embodiments, when there are a predetermined amount of items related to a subtopic, it may elevated to be a topic (or created as its own bookmark data structure). After step 412, the bookmark engine awaits the next content item to be bookmarked.

At step 414, the bookmark engine links the data structure to the topic. In some embodiments, a bookmark node may be moved or linked to a specific topic data structure. In some embodiments, topic field data may be added to the bookmark data structure. In some embodiments, links may be made, for instance, with pointers or URLs between nodes, as depicted, e.g., in FIG. 3. In some embodiments, links may be made inherently when a new node is added to a topic data structure (or to a subtopic). In some embodiments, links may not be made until a predetermined threshold number (e.g., 3) of bookmark entries with a matching topic are saved to the data structure.

At step 416, the bookmark engine identifies related bookmarks with the same topic. For instance, once a bookmark has a topic, a bookmark may be related to other bookmarks with that topic by sharing a subtopic.

At step 418, the bookmark engine compares a subtopic with related bookmarks. For example, the bookmark engine may compare a subtopic of "pasta" for content 102 depicted in scenario 100 of FIG. 1 or node 350 of data structure 300 of FIG. 3, e.g., television program "Pastability," to nodes 332, 334, 336, 338, and other nodes of data structure 300.

At step 420, the bookmark engine determines whether the subtopic is related to one or more other related bookmarked items. In data structure 300 of FIG. 3, for instance, nodes 332, 334, 336, 338 are each linked to subtopic 330, "Pasta," and are considered to have a subtopic of or similar to "pasta." In data structure 300, the exemplary nodes linked with subtopic 320, "Steak," are considered to have a subtopic of or similar to "steak." In some embodiments, the bookmark engine looks for nodes with related subtopics to link to the new bookmark node.

At step 424, the bookmark engine links data structures of subtopic-related bookmarks. For example, in data structure 300 of FIG. 3, nodes 332, 334, 336, 338 are each linked to subtopic 330, "Pasta." A subtopic of "pasta" for "Pastability" may be matched and linked with nodes with, e.g., "Pasta" of subtopic 330. In some embodiments, links may not be made until a predetermined threshold number of bookmark entries with a matching subtopic are saved to the data structure.

FIG. 5 depicts an illustrative flow diagram of a process, process 500, for training a machine learning model to detect bookmark topics in content data, in accordance with some embodiments of the disclosure. In some embodiments, detecting a bookmark topic may be accomplished with predictive modeling. For instance, a trained neural network may be used to classify a portion of provided content data by a topic or category. Generally, a training set comprising content data with various labeled bookmark topics may be used to train a neural network to predict a topic category for new content data.

Training a neural network to accurately detect bookmark topics may be accomplished in many ways. Some embodiments may use supervised learning where, e.g., a training data set includes labels identifying bookmark topics (and/or non-bookmark topics). Some embodiments may use unsupervised learning that may identify bookmark topics in training data by clustering similar data. Some embodiments may use semi-supervised learning where a portion of labeled content data may be combined with unlabeled data during training. In some embodiments, reinforcement learning may be used. With reinforcement learning, a predictive model is trained from a series of actions by maximizing a "reward function," via rewarding correct labeling and penalizing improper labeling. Scenario 500 includes data labels 512, indicating a supervised or semi-supervised learning situation.

A location of a bookmark topic within a video frame may be determined, for instance, by determining a subsection of a content item. In some embodiments, portions a video frame may be provided to a trained neural network for labeling and the coordinates and/or dimensions of the subsection, labeled as including a bookmark topic, may be returned. Portions of a video frame may be provided to a trained neural network as, e.g., content features. In some embodiments, labels returned by a trained neural network may include one or more categories of topics (and/or subtopics). A trained neural network may return a general category like "Recipe" or something as specific as "Dinner Recipes" or "Pasta." A trained neural network may return a label of several topics identified.

Scenario 500 depicts training content data 510 along with data labels 512. Training data for bookmark topic identification may be collected by manually labeling training contents with bookmark topics like Recipes, History, Sports, News, Technology, Science, Games, or even more detailed topics. Content data without a bookmark topic, e.g., from a control group, may also be captured and used. In some circumstances, an analyst may mark incoming content data with one or more bookmark topic labels, e.g., in near real time, to create the training data set. From the content data collected, at least two groups of data may be created: training content data 510 and test data 524.

In scenario 500, training content data 510 is pre-processed using feature extraction to form training content features 516. Pre-processing of training data is used to obtain proper data for training. In some embodiments, pre-processing may involve, for example, scaling, translating, rotating, converting, normalizing, changing of bases, and/or translating coordinate systems in content data. In some embodiments, pre-processing may involve filtering content data, e.g., to eliminate content noise. In some embodiments, text may be extracted and interpreted.

After pre-processing, training content features 516 are fed into Machine Learning Algorithm (MLA) 520 to generate an initial machine learning model, e.g., bookmark topic predictive model 540. In some embodiments, MLA 520 uses numbers, e.g., between 1 and 10, for topics and then translates the numbers to a word. The more data that is provided, the more accurate MLA 520 will be in creating a model, e.g., bookmark topic predictive model 540.

Once MLA 520 creates bookmark topic predictive model 540, test data may be fed into the model to verify the system and test how accurately model 540 behaves. In some embodiments, test data 524 is pre-processed to become a content feature 536 and passed to bookmark topic predictive model 540 for a prediction. Bookmark topic predictive model 540 identifies whether the input test data includes a bookmark topic or not. In some embodiments, each iteration of test data 524 is classified and reviewed for accuracy. For example, if expected label 550 is not correct, false result 552 may be fed back into MLA 520 as learning data. If, after test data 524 is classified and reviewed, model 540 does not perform as expected (e.g., an error rate below 5%) then additional training data may be provided until the model meets the expected criteria. In some embodiments, a reinforcement learning method may be incorporated with test data to reward or punish MLA 520.

Once bookmark topic predictive model 540 works as expected, new real-time data may be fed to the model, and determinations of whether the data includes a bookmark topic may be predicted with confidence. For instance, in scenario 500, new content data 530 may be pre-processed as content feature 536 and passed to bookmark topic predictive model 540 for a prediction. Bookmark topic predictive model 540 may evaluate content feature 536 and present a label of bookmark topic or no bookmark topic for the data. If new content data can be verified outside the system, model 540 may be further updated with feedback and reinforcement for further accuracy.

In some embodiments, bookmark topic predictive model 540 may be trained to label subtopics in a similar manner. In some cases, subtopic labeling may be performed instead of topic labeling. For example, some embodiments of a predictive model may label content by subtopics instead of topics and then categorize each subtopic under one of several topics.

FIG. 6 is a diagram of an illustrative device, in accordance with some embodiments of the disclosure. Device 600 may be implemented by a device or system, e.g., a device providing a display to a user, or any other suitable control circuitry configured to generate a display to a user of content. For example, device 600 of FIG. 6 can be implemented as equipment 601. In some embodiments, equipment 601 may include set-top box 616 that includes, or is communicatively coupled to, display 612, audio equipment 614 (e.g., speakers or headphones), microphone 616, camera 618, and user input interface 610. In some embodiments, display 612 may include a television display or a computer display. In some embodiments, user interface input 610 is a remote-control device. Set-top box 616 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 600 and equipment 601 may receive content and receive data via input/output (hereinafter "I/O") path 602. I/O path 602 may provide content and receive data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths but are shown as a single path in FIG. 6 to avoid overcomplicating the drawing. While set-top box 616 is shown in FIG. 6 for illustration, any suitable computing device having processing circuitry, control circuitry, and storage may be used in accordance with the present disclosure. For example, set-top box 616 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an application bookmark engine stored in memory (e.g., storage 608). Specifically, control circuitry 604 may be instructed by the application to perform the functions discussed above and below. For example, the application may provide instructions to control circuitry 604 to determine screen positions. In some implementations, any action performed by control circuitry 604 may be based on instructions received from the application.

In some client/server-based embodiments, control circuitry 604 includes communications circuitry suitable for communicating with an application server. A bookmark engine may be a stand-alone application implemented on a device or a server. A bookmark engine may be implemented as software or a set of executable instructions. The instructions for performing any of the embodiments discussed herein of the bookmark engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 6, the instructions may be stored in storage 608, and executed by control circuitry 604 of a device 600.

In some embodiments, a bookmark engine may be a client/server application where only the client application resides on device 600 (e.g., devices 702A-F), and a server application resides on an external server (e.g., server 706). For example, a bookmark engine may be implemented partially as a client application on control circuitry 604 of device 600 and partially on server 706 as a server application running on control circuitry. Server 706 may be a part of a local area network with one or more of devices 702A-F or may be part of a cloud computing environment accessed via the internet. In a cloud computing environment, various types of computing services for performing searches on the internet or informational databases, providing storage (e.g., for a database or scoring table) or parsing data are provided by a collection of network-accessible computing and storage resources (e.g., server 706), referred to as "the cloud." Device 600 may be a cloud client that relies on the cloud computing capabilities from server 706 to generate, organize, and present bookmarks and bookmarked content by the bookmark engine. When executed by control circuitry of server 706, the bookmark engine may instruct the control circuitry to generate the bookmark engine output (e.g., content items and/or bookmark data structures) and transmit the generated output to one or more of devices 702A-F. The client application may instruct control circuitry of the receiving device 702A-F to generate the bookmark engine output. Alternatively, one or more of devices 702A-F may perform all computations locally via control circuitry 604 without relying on server 706.

Control circuitry 604 may include communications circuitry suitable for communicating with a bookmark engine server, a table or database server, or other networks or servers. The instructions for carrying out the above-mentioned functionality may be stored and executed on the application server 706. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 608, which is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 608 may be used to store various types of content described herein as well as content guidance data described above. Nonvolatile memory may also be used (e.g., to launch a boot-up routine and other instructions). Cloud-based storage, for example, (e.g., on server 706) may be used to supplement storage 608 or instead of storage 608.

A user may send instructions to control circuitry 604 using user input interface 610. User input interface 610 and display 612 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 612 may include a touchscreen configured to provide a display and receive haptic input. For example, the touchscreen may be configured to receive haptic input from a finger, a stylus, or both. In some embodiments, equipment device 600 may include a front-facing screen and a rear-facing screen, multiple front screens, or multiple angled screens. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 616.

Audio equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio equipment 614 may be provided as integrated with other elements of each one of device 600 and equipment 601 or may be stand-alone units. An audio component of videos and other content displayed on display 612 may be played through speakers (or headphones) of audio equipment 614. In some embodiments, audio may be distributed to a receiver (not shown), which processes and outputs the audio via speakers of audio equipment 614. In some embodiments, for example, control circuitry 604 is configured to provide audio cues to a user, or other audio feedback to a user, using speakers of audio equipment 614. There may be a separate microphone 616 or audio equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

An application (e.g., for generating a display) may be implemented using any suitable architecture. For example, a stand-alone application may be wholly implemented on each one of device 600 and equipment 601. In some such embodiments, instructions of the application are stored locally (e.g., in storage 608), and data for use by the application is downloaded on a periodic basis (e.g., from an out-of-band feed, from an internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 604 may allow a user to provide user profile information or may automatically compile user profile information. For example, control circuitry 604 may access and monitor network data, video data, audio data, processing data, participation data from a participant profile. In some embodiments, control circuitry 604 may calculate several scores, such as a readiness score, based on profile data. Control circuitry 604 may store scores in a database and the database may be linked to a user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across different devices.

In some embodiments, the application is a client/server-based application. Data for use by a thick or thin client implemented on each one of device 600 and equipment 601 is retrieved on demand by issuing requests to a server remote from each one of device 600 and equipment 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

As depicted in FIG. 7, one or more of devices 702A-F may be coupled to communication network 704. Communication network 704 may be one or more networks including the internet, a mobile phone network, mobile voice or data network (e.g., a 5G or 4G or LTE network), cable network, public switched telephone network, Bluetooth, or other types of communication network or combinations of communication networks. Thus, devices 702A-F may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communication path or combination of such paths.

In some embodiments, the application is downloaded and interpreted or otherwise run by an interpreter or virtual machine (e.g., run by control circuitry 604). In some embodiments, the application may be encoded in the ETV Binary Interchange Format (EBIF), received by control circuitry 604 as part of a suitable feed, and interpreted by a user agent running on control circuitry 604. For example, the application may be an EBIF application. In some embodiments, the application may be defined by a series of JAVA-based files that are received and run by a local virtual machine or other suitable middleware executed by control circuitry 604.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

detecting, during a time period, that a device associated with a user profile has accessed a plurality of different content items related to a topic;

based at least in part on a number of the plurality of different accessed content items related to the topic that were accessed during the time period exceeding a threshold number:

enabling, for the device, a bookmark mode for the topic; and generating a bookmark data structure for the topic, wherein the bookmark data structure is configured for storing data for a plurality of bookmarks for the topic and is modifiable for adding more bookmarks based on future user interface actions detected at the device;

detecting, while the bookmark mode is enabled for the topic, that the device is accessing an additional content item related to the topic; and based at least in part on (a) the bookmark mode being enabled for the topic, and (b) the detecting that the device is accessing the additional content item related to the topic:

automatically adding, into the bookmark data structure for the topic, a link to the additional content item as a bookmark without a user interface input requesting bookmarking of the link to the additional content item.

2. The method of claim 1, wherein the enabling, for the device, the bookmark mode for the topic comprises:

enabling the bookmark mode based on determining that the number of the plurality of different accessed content items exceeds a threshold number for a predetermined time period.

3. The method of claim 1, wherein the enabling, for the device, the bookmark mode for the topic is further based on receiving a user interface confirmation for enabling the bookmark mode.

4. The method of claim 1, wherein:

the detecting that the device is accessing the additional content item related to the topic comprises:

determining that the additional content item related to the topic comprises a video; and identifying a portion of the video that relates to the topic; and wherein the automatically adding, into the bookmark data structure for the topic, the link comprises:

adding a link that points to the identified portion of the video.

5. The method of claim 1, wherein the automatically adding, into the bookmark data structure for the topic, the link comprises:

adding a link that points to a portion of a web page relevant to the topic.

6. The method of claim 4, further comprising:

generating, based on the identified portion of the video, a preview upon a user interface interaction on the bookmark.

7. The method of claim 5, further comprising:

generating, based on the portion of the web page relevant to the topic, a preview upon a user interface interaction on the bookmark.

8. The method of claim 1, wherein each of the plurality of bookmarks comprises at least one of a respective bookmark node, a respective bookmark title, a respective universal resource locator (URL), or a respective timestamp.

9. The method of claim 1, wherein the bookmark data structure comprises a plurality of subtopics of the topic.

10. The method of claim 1, further comprising generating the bookmark data structure for display as an interactive menu, wherein each of the plurality of bookmarks is selectable and selection of a respective bookmark of the plurality of bookmarks causes display of information indicative of the respective bookmark.

11. The method of claim 1, wherein at least one of the plurality of bookmarks for the topic was previously bookmarked by a user.

12. The method of claim 1, wherein the enabling, for the device, the bookmark mode for the topic is further based on receiving an indication of highlighted text.

13. The method of claim 1, wherein the bookmark data structure comprises at least one of a hierarchy, a tree, a linked list, a queue, a playlist, a matrix, a table, or a blockchain.

14. A system comprising:

input/output circuitry; and control circuitry configured to:

detect, during a time period, that a device associated with a user profile has accessed using the input/output circuitry a plurality of different content items related to a topic via the input/output circuitry;

based at least in part on a number of the plurality of different accessed content items related to the topic that were accessed during the time period exceeding a threshold number:

enable, for the device, a bookmark mode for the topic; and generate a bookmark data structure for the topic, wherein the bookmark data structure is configured for storing data for a plurality of bookmarks for the topic and is modifiable for adding more bookmarks based on future user interface actions detected at the device;

detect, while the bookmark mode is enabled for the topic, that the device is accessing an additional content item related to the topic via the input/output circuitry; and based at least in part on (a) the bookmark mode being enabled for the topic, and (b) the detect that the device is accessing the additional content item related to the topic:

automatically add, into the bookmark data structure for the topic, a link to the additional content item as a bookmark without a user interface input requesting bookmarking of the link to the additional content item.

15. The system of claim 14, wherein the control circuitry is configured to enable, for the device, the bookmark mode for the topic by:

enabling the bookmark mode based on determining that the number of the plurality of different accessed content items exceeds a threshold number for a predetermined time period.

16. The system of claim 14, wherein the control circuitry is further configured to enable, for the device, the bookmark mode for the topic by receiving a user interface confirmation for enabling the bookmark mode.

17. The system of claim 14, wherein:

the control circuitry is configured to detect that the device is accessing the additional content item related to the topic via the input/output circuitry by:

determining that the additional content item related to the topic comprises a video; and identifying a portion of the video that relates to the topic; and wherein the control circuitry is configured to automatically add, into the bookmark data structure for the topic, the link by:

adding a link that points to the identified portion of the video.

18. The system of claim 14, wherein the control circuitry is configured to automatically add, into the bookmark data structure for the topic, the link by:

adding a link that points to a portion of a web page relevant to the topic.

19. The system of claim 17, wherein the control circuitry is further configured to:

generate, based on the identified portion of the video, a preview upon a user interface interaction on the bookmark.

20. The system of claim 18, wherein the control circuitry is further configured to:

generate, based on the portion of the web page relevant to the topic, a preview upon a user interface interaction on the bookmark.

* * * * *